United States Patent [19]
Wu

[11] Patent Number: 5,921,624
[45] Date of Patent: Jul. 13, 1999

[54] SEAT ASSEMBLY FOR A BICYCLE

[76] Inventor: Chin-Chang Wu, No. 9, Alley 12, Lane 108, Yungfeng Rd., Taichung Hsiang, Taichung Hsien, Taiwan

[21] Appl. No.: 08/935,847

[22] Filed: Sep. 23, 1997

[51] Int. Cl.⁶ .................................................. B62J 1/00
[52] U.S. Cl. ............................. 297/215.14; 297/215.15; 297/195.1
[58] Field of Search ........................ 297/195.1, 215.13, 297/215.14, 215.15, 440.22, 440.1, 195.11; 403/84, 104, 373, 381

[56]  References Cited

U.S. PATENT DOCUMENTS

| 4,108,462 | 8/1978 | Martin | 297/215.15 X |
| 4,367,896 | 1/1983 | Kieddu | 297/195.1 |
| 5,433,504 | 7/1995 | Kao | 297/215.15 |
| 5,676,420 | 10/1997 | Kuipers et al. | 297/195.1 X |

FOREIGN PATENT DOCUMENTS

| 2589120 | 4/1987 | France | 297/215.13 |
| 607186 | 8/1960 | Italy | 297/215.15 |

*Primary Examiner*—Milton Nelson, Jr.
*Attorney, Agent, or Firm*—Kirkpatrick & Lockhart LLP

[57] ABSTRACT

A seat assembly includes a seat having a first end portion with a first tube extending from an underside thereof and a second end portion with two second tubes each integrally extending from an underside thereof. A supporting post defines an elongate slot and includes a first end portion with a first post extending upwardly and fixedly received in the first tube and a second forked end portion with two second posts each extending upwardly and each fixedly received in a corresponding one of the two second tubes. A clamping sleeve is securely fitted on the supporting post and includes an inner wall formed with an elongate rib slidably received in the elongate slot.

6 Claims, 3 Drawing Sheets

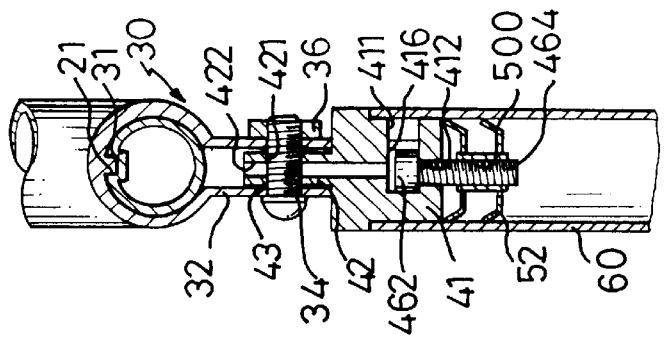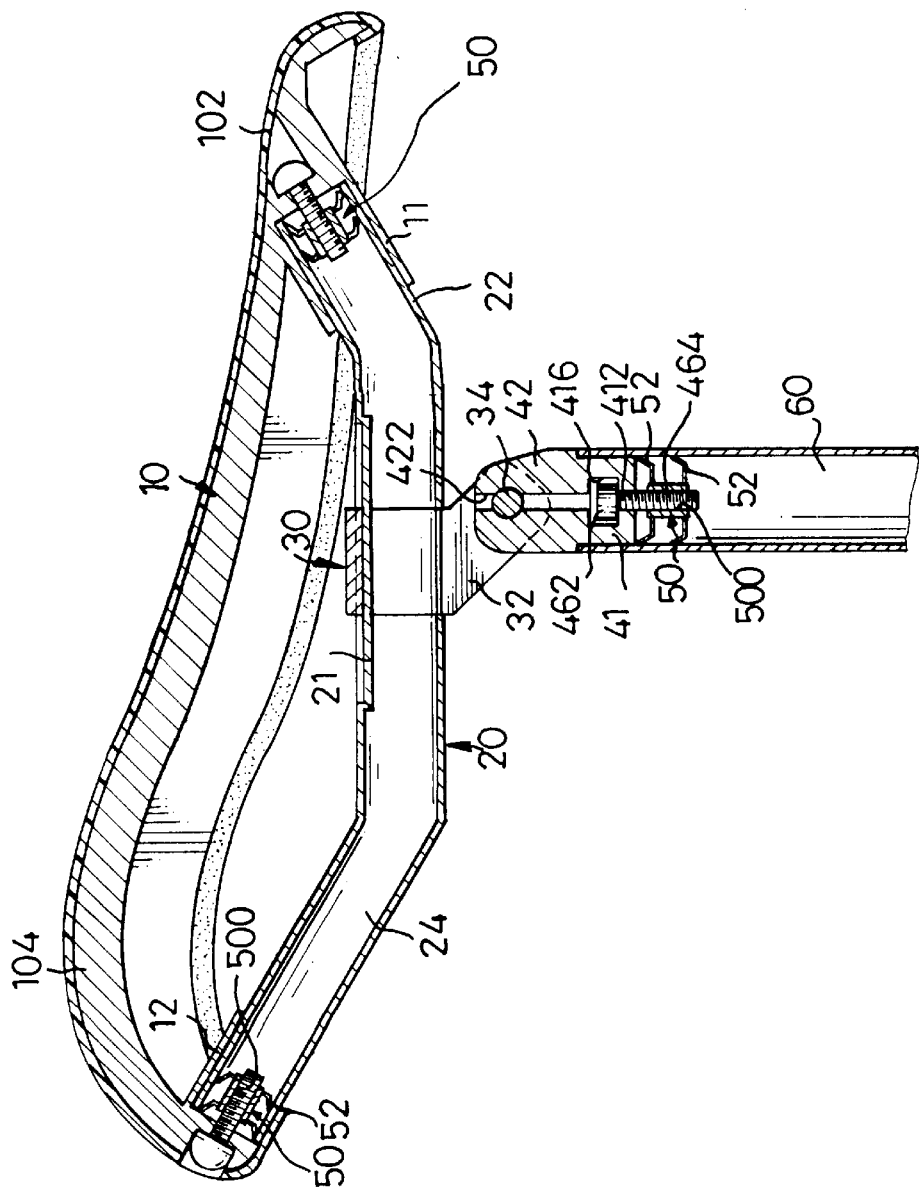

SEAT ASSEMBLY FOR A BICYCLE

FIELD OF THE INVENTION

The present invention relates to a seat assembly, and more particularly to a seat assembly for a bicycle.

BACKGROUND OF THE INVENTION

A conventional seat assembly for a bicycle is shown in FIGS. 4 and 5, and a complete illustration will follow in the detailed description of the preferred embodiments.

The present invention has arisen to mitigate and/or obviate the disadvantage of the conventional seat assembly.

SUMMARY OF THE INVENTION

In accordance with one aspect of the present invention, there is provided a seat assembly comprising a seat having a first end portion with a first tube extending from an underside thereof and a second end portion with two second tubes each extending from an underside thereof.

A supporting post horizontally disposed under the seat defines an elongate slot in an outer wall thereof and has a first end portion with a first post extending upwardly and fixedly received in the first tube and a second forked end portion with two second posts each extending upwardly and each fixedly received in a corresponding one of the two second tubes.

A C-shaped clamping sleeve is securely fitted on the supporting post and includes an inner wall with an elongate rib radially and inwardly extending and slidably received in the elongate slot.

Further features of the present invention will become apparent from a careful reading of the detailed description with appropriate reference to the accompanying drawings.

BRIEF DESCRIPTION OF THE DRAWINGS

FIG. 2 is a front plan cross-sectional assembly view of the seat assembly shown in FIG. 1;

FIG. 3 is a side cross-sectional assembly view of the seat assembly shown in FIG. 1;

DETAILED DESCRIPTION OF THE PREFERRED EMBODIMENTS

Figure 4:
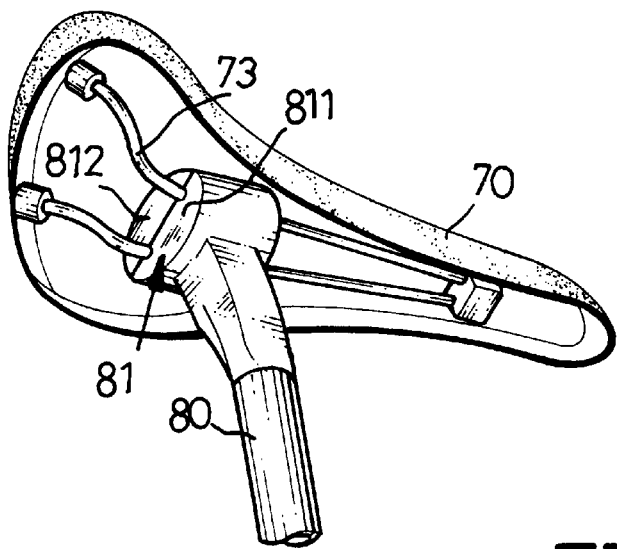
FIG. 4 is a perspective view of a conventional seat assembly in accordance with the prior art.
Figure 5:
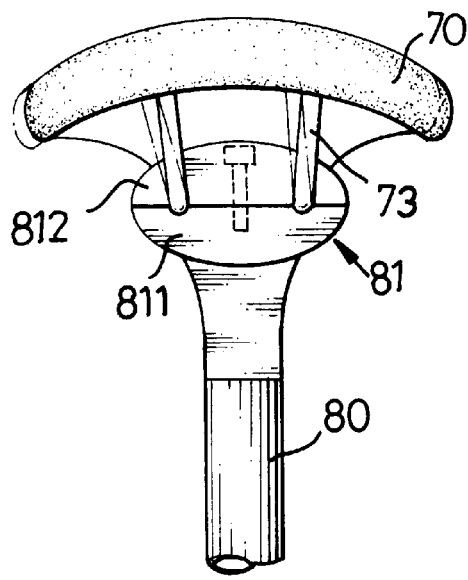
FIG. 5 is a side operational view of the seat assembly shown in FIG. 4.

For a better understanding of features and benefits of the present invention, reference is now made to FIGS. 4 and 5, illustrating a conventional seat assembly for a bicycle in accordance with the prior art.

The conventional seat assembly comprises a seat 70, two supporting stays 73 fixedly mounted on an underside of the seat 70, and a positioning member 81 including a supporting base 811 fitted on an upper end portion of a seat post 80 and supported under the two supporting stays 73, and an end cap 812 co-operating with the supporting base 811 for positioning the two supporting stays 73, thereby fitting the seat 70 on the seat post 80.

By such an arrangement, however, the two supporting stays 73 tend to flex relative to the positioning member 81 as shown in phantom lines in FIG. 5 when a large torque exerted on the seat 70 such that the seat 70 easily tilt on the seat post 80, thereby causing an uncomfortable sensation to a rider.

Figure 1:
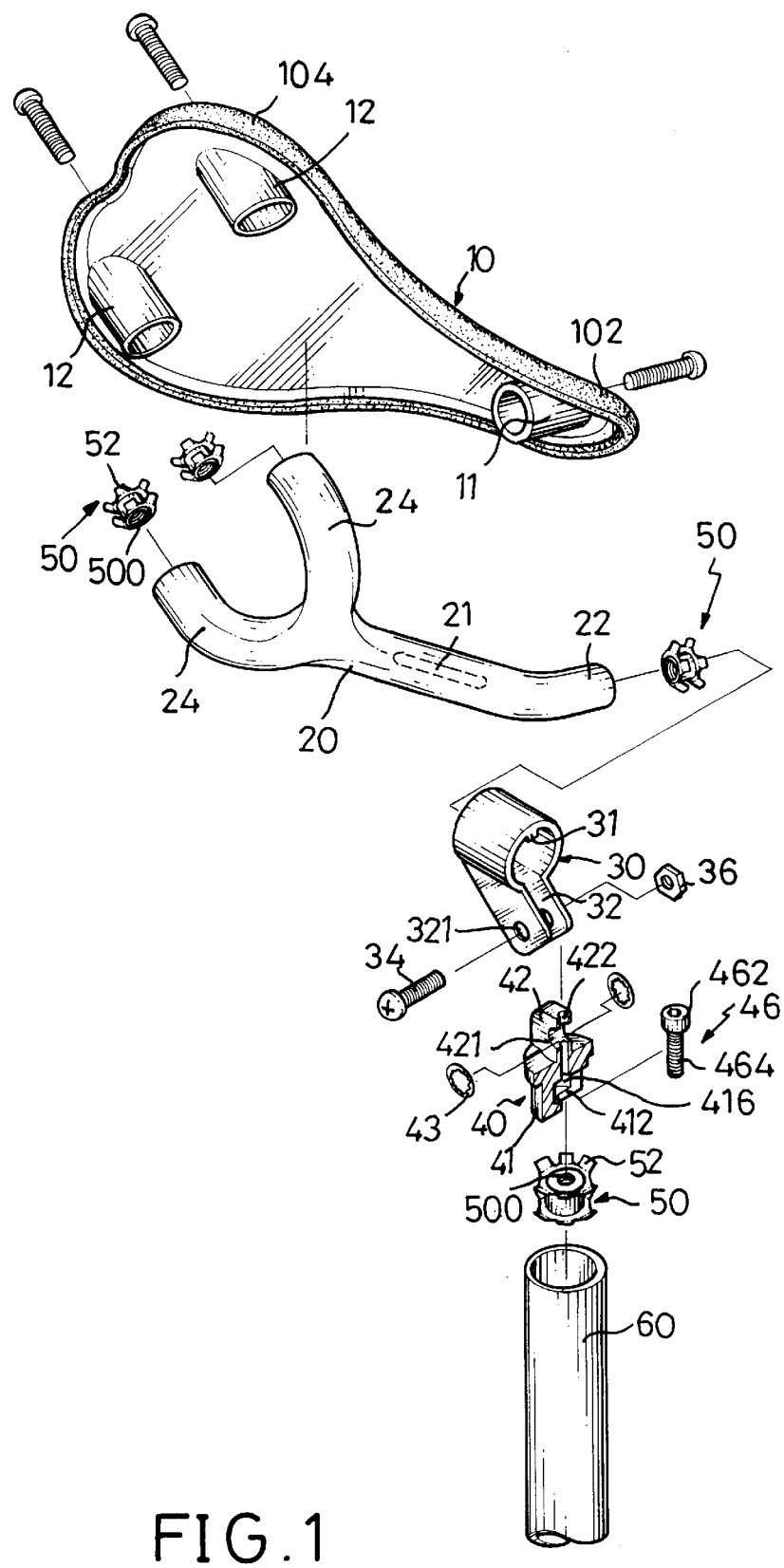
FIG. 1 is a partially cross-sectional exploded view of a seat assembly according to the present invention.

Referring now to FIGS. 1–3, a seat assembly for a bicycle according to the present invention comprises a seat 10 including a first end portion 102 with a first tube 11 extending in an inclined manner from an underside thereof and a second end portion 104 with two second tubes 12 each integrally extending in an inclined manner from an underside thereof.

A supporting post 20 is horizontally disposed under the seat 10 and includes a first end portion with a first post 22 extending upwardly in an inclined manner and fixedly received in the first tube 11 and a forked second end portion with two second posts 24 each extending upwardly in an inclined manner and each fixedly received in a corresponding one of the two second tubes 12. An elongate slot 21 is defined along an outer wall of the supporting post 20

A C-shaped clamping sleeve 30 is securely fitted on the supporting post 20 and includes an inner wall with an elongate rib 31 radially and inwardly extending and slidably received in the elongate slot 21.

The C-shaped clamping sleeve 30 includes two spaced free end portions each with an ear 32 extending downwardly and defining a hole 321 therein.

A positioning member 40 includes a retaining plate 42 received between the two ears 32 and defining a bore 421 aligning with the hole 321 of each of the two ears 32. A first positioning bolt 34 extends through the hole 321 of each of the two ears 32 and the bore 421 of the retaining plate 42 and is threadedly engaged with a nut 36, thereby clamping each of the two ears 32 on the retaining plate 42, and thereby securely positioning the clamping sleeve 30 on the supporting post 20.

Preferably, two internal tooth lock washers 43 are each urged between the retaining plate 42 and a corresponding one of the two ears 32.

A cylindrical base 41 is formed on or mounted on an underside of the retaining plate 42 and is fitted in an upper end portion of a seat post 60. A space 416 is defined in the cylindrical base 41, and a socket 412 is defined in an underside of the cylindrical base 41 and communicates with the space 416.

A fastener member 50 disposed under the cylindrical base 41 is securely received in the upper end portion of the seat post 60 and defines a bolthole 500 therein.

A second positioning bolt 46 includes a head 462 received in the space 416 and a threaded shank 464 extending through the socket 412 and securely engaged in the bolthole 500, thereby coupling the cylindrical base 41 with the fastener member 50.

A cavity 411 is transversely defined in an outer wall of the cylindrical base 41 and communicates with the space 416 such that the second positioning bolt 46 can be inserted into the space 416 via the cavity 411.

A passage 422 functioning as a tool inlet is vertically defined through the retaining plate 42 and communicates with the space 416 such that a tool such as a hex wrench (not shown) can extend through the passage 422 to reach the head 462 of the second positioning bolt 46 for operating the positioning bolt 46.

The fastener member 50 includes an upper portion and a lower end portion both formed with a plurality of bent flexible pieces 52 each extending upwardly and outwardly and each urged on an inner wall of the upper end portion of the seat post 60.

In assembly, the fastener member 50 can initially be inserted into the upper end portion of the seat post 60 with each of the bent flexible pieces 52 urged on the inner wall of the upper end portion of the seat post 60.

The cylindrical base 41 with the head 462 of the second positioning bolt 46 being pre-received in the space 416 via the cavity 411 can then be inserted into the upper end portion of the seat post 60.

The hex wrench can then extend through the passage 422 to reach the head 462 of the second positioning bolt 46 for operating the positioning bolt 46 whose threaded shank 464 can then be rotated relative to the fastener member 50 in the bolthole 500, thereby lifting the fastener member 50 together with the flexible pieces 52 such that each of the bent flexible pieces 52 urging on the inner wall of the seat post 60 can be further expanded outwardly to be securely urged on the inner wall of the seat post 60 due to its resilience, thereby securely fitting the cylindrical base 41 on the upper end portion of the seat post 60.

The two ears 32 of the clamping sleeve 30 fitted on the supporting post 20 can then be mounted on the retaining plate 42 and the first positioning bolt 34 can then extend through the hole 321 of each of the two ears 32 and the bore 421 of the retaining plate 42 and can be threadedly engaged with the nut 36, thereby clamping each of the two ears 32 on the retaining plate 42, and thereby securing the supporting post 20 on the clamping sleeve 30.

The seat 10 can then be mounted on the supporting post 20 with the first post 22 fitted in the first tube 11 and wish each of the two second posts 24 fitted in a respective one of the two second tubes 12, thereby assembling the seat assembly.

By such an arrangement, the supporting post 20 cannot be turned relative to the clamping sleeve 30 because the elongate rib 31 is retained by the outer wall defining the elongate slot 21 such that the seat 10 will not turn relative to the seat post 60.

In addition, the supporting post 20 can be displaced relative to the clamping sleeve 30 by means of the elongate rib 31 sliding in the elongate slot 21, thereby adjusting the position of the seat 10.

Alternatively, the fastener member 50 can be fitted in the first post 22 and each of the two second posts 24 such that the seat 10 can be securely mounted on the supporting post 20. The operation for securing the fastener member 50 in the first post 22 and each of the two second posts 24 is similar to that as is described above and will not be further described.

It should be clear to those skilled in the art that further embodiments of the present invention may be made without departing from the spirit and scope of the present invention.

What is claimed is:

1. A seat assembly comprising:

a seat (10) including a first end portion (102) with a first tube (11) extending from an underside thereof and a second end portion (104) with two second tubes (12) each extending from an underside thereof;

a supporting post (20) horizontally disposed under said seat (10) and including a first end portion with a first post (22) extending upwardly and fixedly received in said first tube (11) and a second forked end portion with two second posts (24) each extending upwardly and each fixedly received in a corresponding one of said two second tubes (12), an elongate slot (21) defined in an outer wall of said supporting post (20); and a C-shaped clamping sleeve (30) securely fitted on said supporting post (20) and including an inner wall with an elongate rib (31) radially and inwardly extending and slidably received in said elongate slot (21).

2. The seat assembly according to claim 1, wherein said clamping sleeve (30) has two spaced free end portions each with an ear (32) extending downwardly and defining a hole (321), and said seat assembly further comprises:

a positioning member (40) including a retaining plate (42) received between said two ears (32) and defining a bore (421) aligning with said hole (321) of each of said two ears (32), and a cylindrical base (41) mounted on an underside of said retaining plate (42) and defining a space (416) therein, and a socket (412) defined in an underside of said cylindrical base (41) and communicating with said space (416);

a first positioning bolt (34) extending through said hole (321) of each of said two ears (32) and said bore (421) of said retaining plate (42) and engaged with a nut (36), thereby clamping each of said two ears (32) on said retaining plate (42);

a seat post (60) including an upper end portion securely fitted on said cylindrical base (41);

a fastener member (50) securely received in said upper end portion of said seat post (60) and defining a bolthole (500) therein; and a second positioning bolt (46) including a head (462) received in said space (416) and a threaded shank extending through said socket (412) and engaged in said bolthole (500), thereby coupling said cylindrical base (41) with said fastener member (50).

3. The seat assembly according to claim 2, wherein said fastener member (50) includes an upper portion formed with a plurality of flexible pieces (52) each extending upwardly and outwardly and each urged on an inner wall of said upper end portion of said seat post (60).

4. The seat assembly according to claim 2, wherein said fastener member (50) includes a lower portion formed with a plurality of flexible pieces (52) each extending upwardly and outwardly and each urged on an inner wall of said upper end portion of said seat post (60).

5. The seat assembly according to claim 2, further comprising two internal tooth lock washers (43) each urged between said retaining plate (42) and a corresponding one of said two ears (32).

6. The seat assembly according to claim 2, wherein a passage (422) is vertically defined through said retaining plate (42) and communicates with said space (416), and a cavity (411) is transversely defined in an outer wall of said cylindrical base (41) and communicates with said space (416).

* * * * *